United States Patent
Ohkura et al.

(10) Patent No.: US 6,963,527 B2
(45) Date of Patent: Nov. 8, 2005

(54) INFORMATION RECORDING METHOD AND OPTICAL RECORDING MEDIUM THEREFOR

(75) Inventors: Hiroko Ohkura, Sagamihara (JP); Yoshiyuki Kageyama, Yokohama (JP); Makoto Harigaya, Hiratsuka (JP); Hajime Yuzurihara, Odawara (JP); Eiko Hibino, Yokohama (JP); Hiroshi Miura, Yokohama (JP); Miku Mizutani, Kumagaya (JP)

(73) Assignee: Ricoh Company, Ltd., Tokyo (JP)

( * ) Notice: Subject to any disclaimer, the term of this patent is extended or adjusted under 35 U.S.C. 154(b) by 359 days.

(21) Appl. No.: 10/352,727

(22) Filed: Jan. 28, 2003

(65) Prior Publication Data

US 2003/0152006 A1 Aug. 14, 2003

(30) Foreign Application Priority Data

Jan. 30, 2002 (JP) ........................ 2002-021361

(51) Int. Cl.$^7$ ............................... G11B 5/76
(52) U.S. Cl. ................. 369/59.11; 369/53.26
(58) Field of Search .................... 369/47.5, 47.51, 369/53.26, 53.27, 53.31, 53.34, 59.11, 59.12, 59.19, 59.23, 59.24

(56) References Cited

U.S. PATENT DOCUMENTS

| | | | |
|---|---|---|---|
| 5,709,978 A | 1/1998 | Hirotsune et al. | 430/270.13 |
| 5,732,062 A | 3/1998 | Yokoi et al. | |
| 5,740,149 A | 4/1998 | Iwasaki et al. | 369/116 |
| 5,761,179 A | 6/1998 | Iwasaki et al. | 369/116 |
| 5,875,160 A | 2/1999 | Harigaya et al. | 369/44.27 |
| 5,948,496 A | 9/1999 | Kinoshita et al. | 428/64.1 |
| 6,096,398 A | 8/2000 | Yuzurihara et al. | 428/64.1 |

(Continued)

FOREIGN PATENT DOCUMENTS

| | | |
|---|---|---|
| EP | 1 056 077 A | 11/2000 |
| EP | 1 117 094 A | 7/2001 |
| EP | 1193696 | 4/2002 |
| JP | 09134525 | 5/1997 |

OTHER PUBLICATIONS

Patent Abstracts of Japan, vol. 2003, No. 03, May 5, 2003, abstract of JP 2002 331758A, Nov. 19, 2002.
U.S. Appl. No. 10/116,582, filed Apr. 4, 2002.
U.S. Appl. No. 10/151,324, filed May 20, 2002.
U.S. Appl. No. 10/071,068, filed Feb. 7, 2002.
U.S. Appl. No. 10/062,885, filed Jan. 31, 2002.
U.S. Appl. No. 10/085,692, filed Feb. 27, 2002.
U.S. Appl. No. 09/966,171, filed Sep. 28, 2001.
U.S. Appl. No. 09/821,204, filed Mar. 29, 2001.
U.S. Appl. No. 09/951,515, filed Sep. 14, 2001.
U.S. Appl. No. 09/665,473, filed Sep. 20, 2000.
U.S. Appl. No. 09/534,183, filed Mar. 24, 2000.
U.S. Appl. No. 09/568,723, filed May 11, 2000.
U.S. Appl. No. 09/498,375, filed Feb. 4, 2000.
U.S. Appl. No. 09/539,865, filed Mar. 31, 2000.

*Primary Examiner*—Paul W. Huber
(74) *Attorney, Agent, or Firm*—Cooper & Dunham LLP

(57) ABSTRACT

An information recording method including irradiating a phase change recording layer of an optical recording medium with either a multi-pulse laser light train having a recording power of Pw or laser light having an erasing power Pe to record a mark having a length nT in the recording layer, wherein n is an integer of from 3 to 14 and T represents a clock cycle, wherein the multi-pulse laser light train has a constitution such that a heating pulse and a cooling pulse are alternated and the number of heating pulses and the number of cooling pulses each increases by 1 when n increases by 2, and wherein when n is from 6 to 14, the last heating pulse and last cooling pulse have a pulse width of from 0.5T to 0.9T and from 0.7T to 1.5T, respectively.

9 Claims, 10 Drawing Sheets

U.S. PATENT DOCUMENTS

| | | |
|---|---|---|
| 6,177,167 B1 | 1/2001 | Yuzurihara et al. ......... 428/64.1 |
| 6,221,557 B1 | 4/2001 | Harigaya et al. ...... 430/270.13 |
| 6,391,417 B1 | 5/2002 | Yuzurihara et al. ......... 428/64.1 |
| 6,426,936 B1 | 7/2002 | Shinotsuka et al. ...... 369/275.2 |
| 2001/0041240 A1 | 11/2001 | Ito et al. ..................... 428/64.4 |
| 2002/0021643 A1 | 2/2002 | Miura et al. |
| 2002/0110063 A1 | 8/2002 | Yamada et al. |
| 2002/0145963 A1 | 10/2002 | Narumi et al. ........... 369/59.11 |
| 2002/0155248 A1 | 10/2002 | Ito et al. ..................... 428/66.4 |
| 2002/0160306 A1 | 10/2002 | Hanaoka et al. ....... 430/270.13 |
| 2003/0003395 A1 | 1/2003 | Yuzurihara et al. .... 430/270.13 |
| 2003/0012917 A1 | 1/2003 | Harigaya et al. .......... 428/64.4 |

FIG. 3

| MARK LENGTH | A | C1 | B1 | C2 | B2 | C3 | B3 | C4 | B4 | C5 | B5 | C6 | Br | Cr |
|---|---|---|---|---|---|---|---|---|---|---|---|---|---|---|
| 3T | 1.0T | | | | | | | | | | | | | 1.4T |
| 4T | 1.0T | 1.0T | | | | | | | | | | | 0.5T | 1.3T |
| 5T | 1.0T | 1.5T | | | | | | | | | | | 0.9T | 1.1T |
| 6T | 1.0T | 1.0T | 1.0T | 1.0T | | | | | | | | | 0.7T | 1.0T |
| 7T | 1.0T | 1.5T | 1.0T | 1.3T | | | | | | | | | 0.7T | 1.0T |
| 8T | 1.0T | 1.0T | 1.0T | 1.0T | 1.0T | 1.0T | | | | | | | 0.7T | 1.0T |
| 9T | 1.0T | 1.5T | 1.0T | 1.0T | 1.0T | 1.3T | | | | | | | 0.7T | 1.0T |
| 10T | 1.0T | 1.0T | 1.0T | 1.0T | 1.0T | 1.0T | 1.0T | 1.0T | | | | | 0.7T | 1.0T |
| 11T | 1.0T | 1.5T | 1.0T | 1.0T | 1.0T | 1.0T | 1.0T | 1.3T | | | | | 0.7T | 1.0T |
| 14T | 1.0T | 1.0T | 1.0T | 1.0T | 1.0T | 1.0T | 1.0T | 1.0T | 1.0T | 1.0T | 1.0T | 1.0T | 0.7T | 1.0T |

INFORMATION RECORDING METHOD AND OPTICAL RECORDING MEDIUM THEREFOR

BACKGROUND OF THE INVENTION

1. Field of the Invention

The present invention relates to an information recording method for recording information in a recording medium having a recording layer which can reversibly achieve a crystal phase and an amorphous state by irradiating the recording layer with a multi-pulse laser light train emitted from a light source, and an optical recording medium for the information recording method.

2. Discussion of the Background

Along with the popularization of multimedia, playback-only optical recording media (hereinafter sometimes referred to as media) such as audio CDs and CD-ROMs and information reproduction apparatus have been developed and practically used. Recently, not only recordable optical discs using a dye medium and rewritable magnetooptic discs (MOs) using a magnetooptic medium, but also phase change type media attract attention.

Such phase change type media includes a material having a phase change property of reversibly achieving a crystal phase and an amorphous state and information is recorded therein utilizing the property. Information can be recorded in the phase change type media and the recorded information can be reproduced, using only laser light emitted from a laser diode (i.e., without using an external magnetic field), which is needed for recording information in MOs. In addition, it is possible to perform overwriting in which information can be recorded while erasing previously recorded information using laser light at the same time.

A typical waveform of recording laser light pulses for use in recording information in a phase change recording medium is the waveform of single pulse laser light emitted by a laser diode which is illustrated in FIG. 17 and which is generated according to, for example, an Eight Fourteen Modulation code (i.e., EFM). As can be understood from the waveform illustrated FIG. 17, the recording power PWA is set so as to be higher than the read power PR. When a pulse having such a waveform is applied to a phase change recording medium, problems such that the resultant recording mark deforms like a tear drop, and marks having a low reflectance against laser light cannot be obtained because the irradiated portion of the recording layer achieves an incomplete amorphous state due to slow cooling speed of the recorded mark.

In attempting to solve such problems, an information recording method which is illustrated in FIG. 18 is proposed for recording information in a phase change recording medium. In the method, as illustrated in FIG. 18, a mark is formed on a phase change recording medium by irradiating the recording medium with laser light which has a multi-pulse emission waveform and multilevel recording powers and which is generated according to an EFM code.

When a mark is recorded in a phase change recording medium using the multi-pulse laser light train, the corresponding portion of the multi-pulse laser light is constituted of a first heating pulse A by which the recording layer of the recording medium is preliminarily heated so as to be heated to a temperature not lower than the melting point thereof, plural heating pulses B which follow the first heating pulse A and by which the recording layer is further heated, plural cooling pulses which are located between the first heating pulse A and the top of the heating pulses B and between the heating pulses B, and a last cooling pulse C. In the method, the following relationship is satisfied:

$$PWB \geq PWA > PWC \approx PR$$

wherein PWB represents the emission power of the heating pulse B, PWA represents the emission power of the first heating pulse A, PWC represents the emission power of the cooling pulse C and PR represents the read power.

When erasing a mark previously formed in a phase change recording medium using the multi-pulse laser light train, the corresponding portion of the multi-pulse laser light train is constituted of an erase pulse D. The emission power PED of the erase pulse D is set so as to satisfy the following relationship:

$$PWC < PED < PWA.$$

When this recording method is used, the mark area of the recording layer achieves an amorphous state because the heated area is rapidly cooled, and the space area achieves a crystal state because the area is heated and then gradually cooled without forcible cooling. Thus, the recording medium has a large reflectance difference between the mark (i.e., the area in an amorphous state) and space (i.e., the area in a crystal state).

The methods for recording information in an optical recording media are classified into a mark position recording method (i.e., Pulse Position Modulation, PPM) and a mark edge recording method (i.e., Pulse Width Modulation, PWM). Recently, the mark edge recording method is typically used because of being able to be used for high density recording. When information is recorded in a phase change recording medium by a mark edge recording method, the heating pulse typically has a pulse width of 0.5T and the cooling pulse also has a pulse width of 0.5T, wherein T represents a record channel clock cycle.

Namely, information is recorded in a phase change recording medium using laser light having a multi-pulse emission waveform in which a pair of a heating pulse and a cooling pulse is added whenever the mark length (i.e., mark data length) of recording data increases by 1T. FIG. 19 illustrates a typical example of the recording waveform. When high speed recording is performed using this method, the record channel clock (T) is highly frequented at the same rate as that of the linear recording speed, for example, at a rate of twice or four times, without changing the record waveform.

However, as the recording speed increases, the width of the heating pulse and cooling pulse seriously decreases, and thereby it becomes impossible to heat the recording layer so as to reach the heating temperature (i.e., the amorphous temperature) and the cooling temperature (i.e., the crystal temperature), at which the recording layer can change the phase, resulting in formation of incomplete marks. Thus, a problem in that the mark does not have a predetermined mark length occurs.

In attempting to solve the problem, Unexamined Japanese Patent Application No. (hereinafter referred to as JP-A) 9-134525 discloses an information recording method in which a recording mark having a desired mark length is recorded in a recording layer at a high speed by heating and cooling the recording layer for a time enough to sufficiently heat and cool the recording layer without driving a light source driver at a high speed. Specifically the recording method is such that a light source irradiates a phase change recording layer with a first heating pulse followed by plural rear heating pulses, plural rear cooling pulses which are emitted between the first heating pulse and the top of the rear heating pulses and between the plural rear heating pulses, and a last cooling pulse to record a mark therein, wherein when data having a mark length of nT (n is odd or even numbers, and T represents a record channel clock cycle) are recorded, the pulse width of the rear heating pulses and rear cooling pulses is substantially the same as the record channel clock cycle.

In addition, an optical recording medium which has a GeSbTe recording layer and in which information can be recorded in the recording layer at a speed 4.8 times the recording speed of DVD using the information recording method disclosed in JP-A 9-134525 is disclosed in Optical Data Storage (ODS) 2000 Technical Digest (pp. 135–143).

However, when information is repeatedly recorded in a melt-erase mode in the optical recording medium disclosed in ODS 2000 Technical Digest at a speed 4.8 times the DVD speed (i.e., at a speed of 16.8 m/s) using the information recording method disclosed in JP-A 9-134525, the space area of the recording medium does not perfectly achieve a crystallization state (i.e., a part of the space area maintains the amorphous state) because the crystallization speed of the recording medium is not fast enough to match the recording speed, i.e., the recording medium has poor repeat recording properties.

In attempting to solve the problem (i.e., to avoid amorphism of an space area), ODS 2000 Technical Digest discloses a method in which recording is repeatedly performed while the erasing power Pe is decreased to a power such that the recording layer is not fused. However, the recording properties of the information recorded by the method are inferior to those of the information recorded in a melt-erase mode.

SUMMARY OF THE INVENTION

Accordingly, an object of the present invention is to provide an optical recording medium in which information can be repeatedly recorded in a melt-erase mode at a speed four to five times that of the DVD-ROM playback speed (i.e., at a speed of from 14 to 17.5 m/s) and at a recording density equal to or higher than the DVD-ROM recording density.

Another object of the present invention is to provide an information recording method by which information can be recorded in the optical recording medium at a high speed while the recorded information has good recording properties.

To achieve such objects, the present invention contemplates the provision of an information recording method including:

Irradiating a phase-change recording layer of an optical recording medium with either a multi-pulse laser light train having a recording power of Pw or laser light having an erasing power Pe to allow the phase change recording layer to reversibly achieve a crystal state and an amorphous state, thereby recording a mark having a length nT in the recording layer, wherein n is an integer of from 3 to 14 and T represents a clock cycle, wherein the multi-pulse train has a constitution such that a heating pulse and a cooling pulse are alternated, wherein the number of heating pulses and the number of cooling pulses each increases by one when n increases by two, and wherein when n is from 6 to 14, a last heating pulse has a pulse width of from 0.5T to 0.9T and a last cooling pulse has a pulse width of from 0.7T to 1.5T.

It is preferable that a first heating pulse has a pulse width of from 0.7T to 1.3T and a rear heating pulse, which is located between the first heating pulse and the last heating pulse, has a pulse width of from 0.8T to 1.4T.

When n is 3, it is preferable that the first heating pulse has a width of from 0.8T to 1.4T and the last cooling pulse has a width of from 1.1T to 1.9T.

When n is 4, it is preferable that the first heating pulse has a width of from 0.6T to 1.4T, the last heating pulse has a width of from 0.1T to 0.8T and the last cooling pulse has a width of from 0.8T to 1.7T.

When n is 5, it is preferable that the first heating pulse has a width of from 0.5T to 1.6T, the last heating pulse has a width of from 0.6T to 1.2T and the last cooling pulse has a width of from 0.7T to 1.6T.

The ratio (Pe/Pw) of the erasing power (Pe) to the recording power (Pw) is preferably from 0.4 to 0.7.

In addition, it is preferable that the recording layer has a formula of Ge$\alpha$Ga$\beta$Sb$\gamma$Te100−$\alpha$−$\beta$−$\gamma$, wherein $\alpha$ is a number of from 1 to 5 in units of atomic percent, $\beta$ is a number of from 1 to 5 in units of atomic percent, and $\gamma$ is a number of from 70 to 81 in units of atomic percent.

Further, it is preferable that the upper limit of the recrystallization linear speed, below which the recording layer heated by the laser light having a power of Pe recrystallizes is from 14 m/s to 20 m/s.

Furthermore, it is preferable that the recording layer has such a property as to crystallize at a temperature of from 160 to 210° C. when heated at a heating speed of 10° C./min.

As another aspect of the present invention, an optical recording medium is provided which includes a substrate;

a recording layer located overlying the substrate, wherein the recording layer has a formula of Ge$\alpha$Ga$\beta$Sb$\gamma$Te100−$\alpha$−$\beta$−$\gamma$, wherein $\alpha$ is a number of from 1 to 5 in units of atomic percent, $\beta$ is a number of from 1 to 5 in units of atomic percent, and $\gamma$ is a number of from 70 to 81 in units of atomic percent; and a reflection layer located overlying the recording layer.

These and other objects, features and advantages of the present invention will become apparent upon consideration of the following description of the preferred embodiments of the present invention taken in conjunction with the accompanying drawings.

BRIEF DESCRIPTION OF THE DRAWINGS

FIG. 3 is a diagram illustrating the mark lengths of record marks to be recorded and the first heating pulse A, rear cooling pulses C1–C6, rear heating pulses B1–B5, last heating pulse Br, and last cooling pulse Cr of the multi-pulse laser light train;

DETAILED DESCRIPTION OF THE INVENTION

Figure 1:
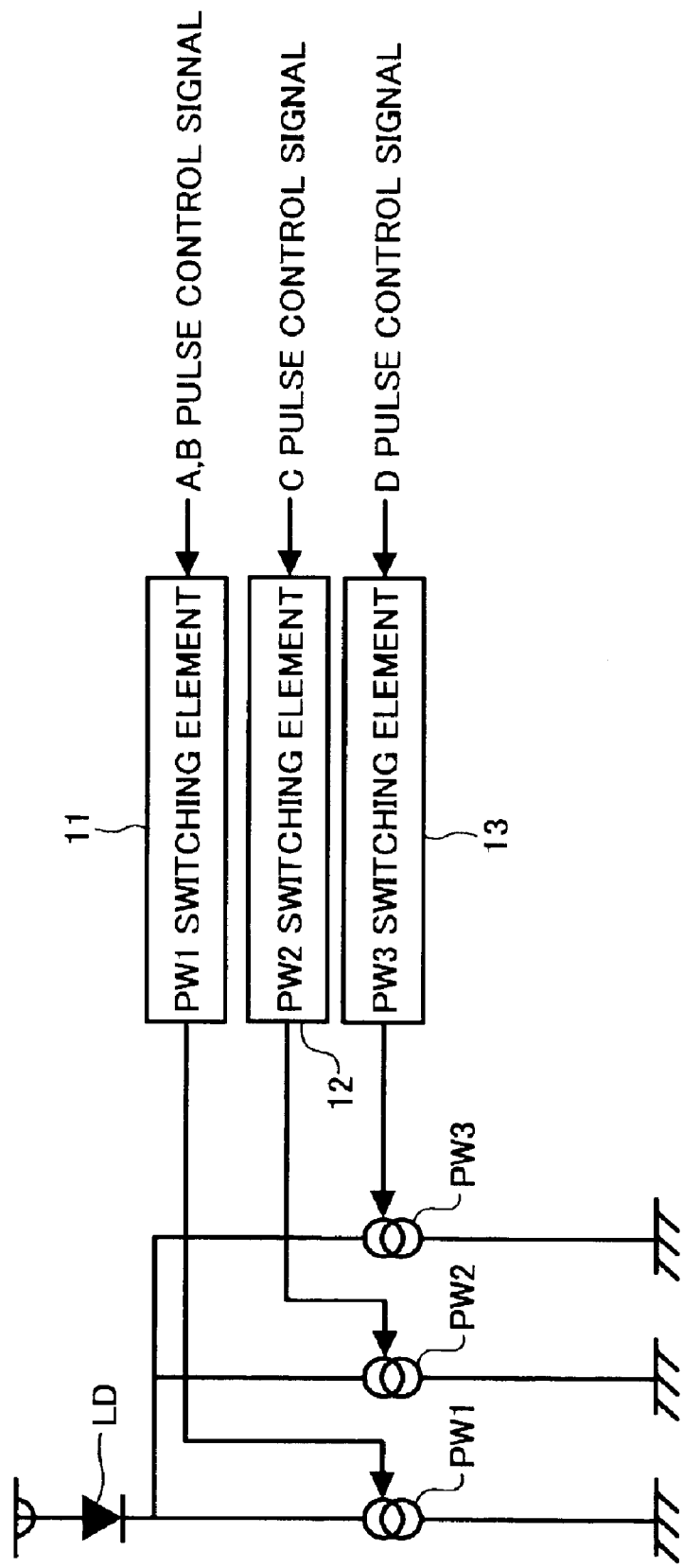
FIG. 1 is a block diagram illustrating the first embodiment of the information record/reproduction apparatus utilizing the information recording method of the present invention.
Figure 2:
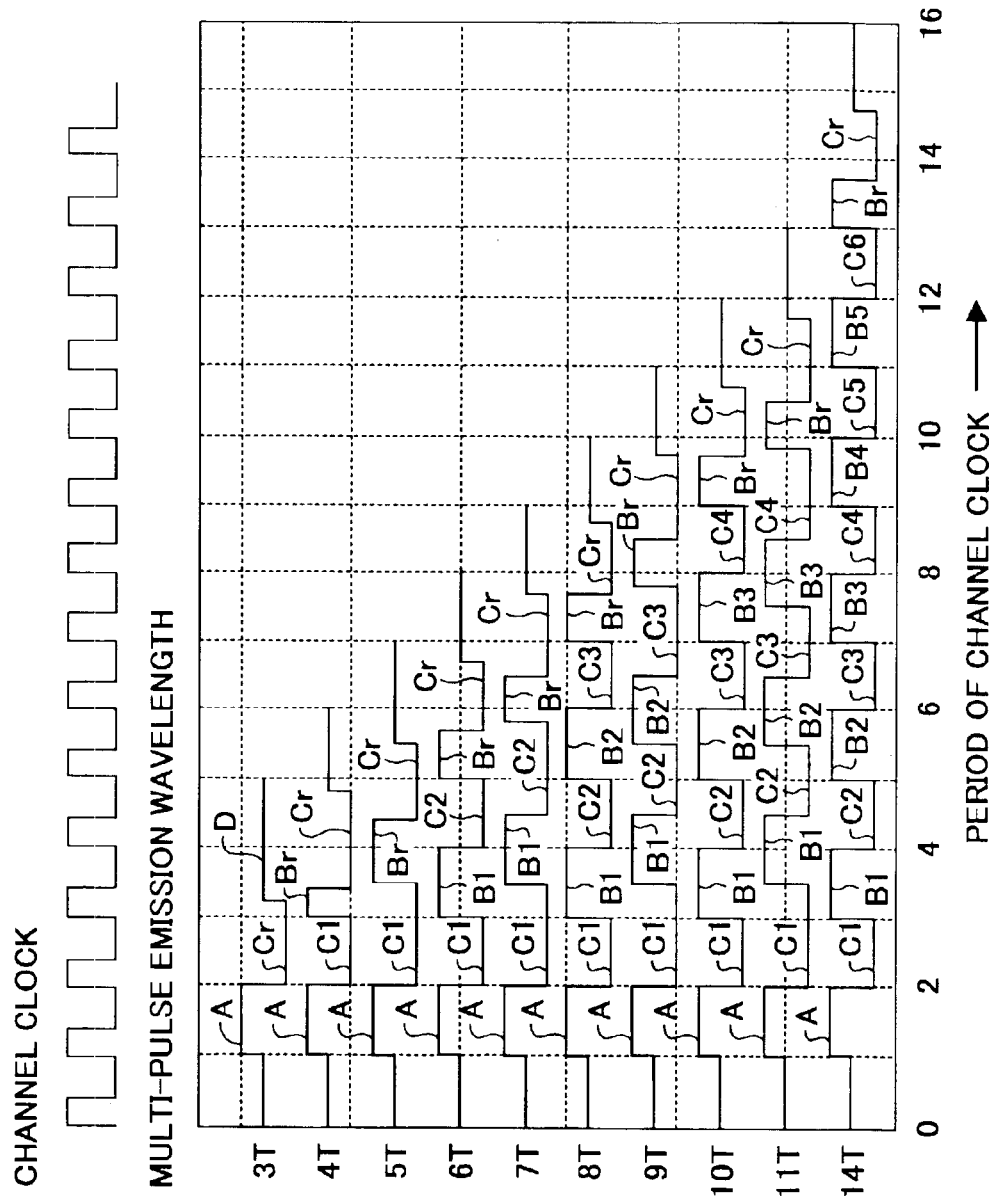
FIG. 2 is a timing chart illustrating the channel clock and the waveforms of the multi-pulse laser light train in the first embodiment of the information record/reproduction apparatus.

FIG. 1 is a block diagram illustrating the first embodiment of the information record/reproduction apparatus utilizing the information recording method of the present invention. FIG. 2 is a timing chart illustrating the channel clock and the waveforms of the multi-pulse laser light train in the first embodiment of the information record/reproduction apparatus. This information record/reproduction apparatus records (i.e., overwrites) information in a phase change recording medium and reproduces the recorded information. The apparatus performs mark edge recording (i.e., PWM) using an EFM code.

The information record/reproduction apparatus includes a digital circuit (not shown) serving as a light intensity control device; a laser diode driving circuit; a laser diode LD serving as a light source of an optical head; a spindle motor configured to rotate a phase change recording medium; the optical head: and an optical system.

When recording is performed, the digital circuit generates pulse control signals according to EFM data. The laser diode driving circuit generates driving current according to the pulse control signals to drive the laser diode LD. Thus, multi-pulse laser light having waveforms as illustrated in FIG. 2 is emitted. The optical head irradiates a phase change recording medium, which is rotated by the spindle motor, with the multi-pulse laser light train emitted by the laser diode LD via the optical system. Thus, record marks are formed in the recording layer of the phase change recording medium, resulting in record of information in the optical recording medium.

The multi-pulse laser light emitted by the laser diode LD are constituted of a first heating pulse A, followed by one or more rear heating pulses B (B1, B2, . . . and B5, in the order from the top to the last); a last heating pulse Br which follows the rear heating pulses B; one or more rear cooling pulses C (C1, C2, . . . and C6, in the order from the top to the last) which are located between the first heating pulse A and the top of the rear heating pulses B, between the plural rear heating pulses B, and between the last of the plural rear heating pulses B and the last heating pulse Br; and a last cooling pulse Cr.

When recording is performed (i.e., record marks having different mark lengths are recorded), the multi-pulse laser light emitted by the laser diode LD is as follows.

As illustrated in FIG. 2, a record mark having a mark length of 3T (T is the cycle of the record channel clock) which is the shortest mark length is recorded by irradiating multi-pulse laser light constituted of a first heating pulse A and a last cooling pulse Cr. A record mark having a mark length of 4T or 5T is recorded by irradiating multi-pulse laser light constituted of a first heating pulse A, a rear cooling pulse C1, a last heating pulse Br and a last cooling pulse Cr, which are sequentially arranged in this order.

A record mark having a mark length of 6T or 7T is recorded by irradiating multi-pulse laser light constituted of a first heating pulse A, a rear cooling pulse C1, a rear heating pulse B1, a rear cooling pulse C2, a last heating pulse Br and a last cooling pulse Cr, which are sequentially arranged in this order.

A record mark having a mark length of 8T or 9T is recorded by irradiating multi-pulse laser light constituted of a first heating pulse A, a rear cooling pulse C1, a rear heating pulse B1, a rear cooling pulse C2, a rear heating pulse B2, a rear cooling pulse C3, a last heating pulse Br and a last cooling pulse Cr, which are sequentially arranged in this order.

A record mark having a mark length of 10T or 11T is recorded by irradiating multi-pulse laser light constituted of a first heating pulse A, a rear cooling pulse C1, a rear heating pulse B1, a rear cooling pulse C2, a rear heating pulse B2, a rear cooling pulse C3, a rear heating pulse B3, a rear cooling pulse C4, a last heating pulse Br and a last cooling pulse Cr, which are sequentially arranged in this order.

A record mark having a mark length of 14T is recorded by irradiating multi-pulse laser light constituted of a first heating pulse A, a rear cooling pulse C1, a rear heating pulse B1, a rear cooling pulse C2, a rear heating pulse B2, a rear cooling pulse C3, a rear heating pulse B3, a rear cooling pulse C4, a rear heating pulse B4, a rear cooling pulse C5, a rear heating pulse B5, a rear cooling pulse C6, a last heating pulse Br and a last cooling pulse Cr, which are sequentially arranged in this order.

Thus, one heating pulse and one cooling pulse are increased when the mark length increases by 2T. In addition, when record marks having a mark length of from 6T to 14T are recorded, the last heating pulse Br preferably has a pulse width of from 0.5T to 0.9T, and the last cooling pulse Cr preferably has a pulse width of from 0.7T to 1.3T.

As illustrated in FIG. 1, constant currents corresponding to the emission power for the first heating pulse A and rear heating pulses B are applied to the laser diode LD from a current generator PW1 in the laser diode driving circuit. Similarly, current generators PW2 and PW3 apply constant currents corresponding to the emission powers of the cooling pulses C and an erase pulse D to the laser diode LD, respectively.

The light intensity control device (not shown) generates A and B pulse control signals, C pulse control signals, and D pulse control signals according to EFM data. Switching elements 11, 12 and 13 put on or off the current generators PW1, PW2 and PW3 according to the A and B pulse control signals, C pulse control signals, and D pulse control signals generated by the light intensity control device so that the laser diode LD emits the multi-pulse laser light as illustrated in FIG. 2.

When the recorded information is reproduced, the laser diode driving circuit allows the laser diode LD to emit laser light by applying a reproduction power (i.e., a read power) thereto. The optical head irradiates the phase change recording medium with the laser light emitted by the laser diode LD and passing through the optical system while the laser light is focused, to reproduce the recorded information. The reflection light reflected from the phase change recording medium is received by a light receiving device via the optical system, and the received light is subjected to a photoelectric treatment, resulting in formation of reproduction signals.

The optical recording medium for use in the information record/reproduction apparatus of the first embodiment has a constitution such that a first dielectric layer, a recording layer, a second dielectric layer, a third dielectric layer, and a reflection/heat-releasing layer (hereinafter referred to as a reflection layer) are formed on a substrate in this order.

Specific examples of the materials for use as the substrate include glass, ceramics, and resins. Among these materials, resin substrates are preferable in view of moldability and cost. Specific examples of the resins for use as the substrate include polycarbonate resins, acrylic resins, epoxy resins, polystyrene resins, silicone resins, fluorine-containing resins, ABS resins, urethane resins, etc. Among these resins, polycarbonate resins are preferable because of having good processability and optical properties. The form of the substrate is not limited to disc forms and card-form and sheet-form substrates can also be used.

The first dielectric layer of the phase change optical recording medium is formed, for example, by sputtering $(ZnS)_{80}(SiO_2)_{20}$. The first dielectric layer functions as a heat-resistant protective layer and an optical interference layer. In order to maximally fulfill the functions, the first dielectric layer preferably has a thickness of from 20 nm to 250 nm. When the first dielectric layer is too thin, the function of the heat-resistant protective layer is hardly fulfilled. In contrast, when the first dielectric layer is too thick, the layer tends to be peeled from the substrate or the adjacent layer.

The recording layer of the optical recording medium is formed, for example, by sputtering a target material which is synthesized so as to have a predetermined formula. The recording layer preferably has a thickness of from 10 to 30 nm. When the recording layer is too thin, the light absorbing ability deteriorates, and thereby the function of the recording layer is hardly fulfilled. In contrast, when the recording layer is too thick, the interference effect deteriorates because the quantity of the transmitted light decreases.

The second dielectric layer of the phase change optical recording medium is formed, for example, by sputtering $(ZnS)_{80}(SiO_2)_{20}$. The second dielectric layer preferably has a thickness of from 10 nm to 40 nm. When the second dielectric layer is too thin, the recording sensitivity and heat resistance deteriorates. In contrast, when the second dielectric layer is too thick, heat is not easily radiated (i.e., heat is stored in the recording medium).

The third dielectric layer of the phase change optical recording medium is formed, for example, by sputtering SiC. The third dielectric layer preferably has a thickness of from 2 nm to 20 nm. When the third dielectric layer is too thin, the preservation property of the recording medium deteriorates because $Ag_2S$ tends to be generated when Ag is used in the reflection layer. In contrast, when the third dielectric layer is too thick, the recording properties deteriorate.

The reflection layer is formed, for example, by sputtering a silver alloy. The reflection layer preferably has a thickness of from 30 nm to 250 nm. When the reflection layer is too thick, the recording sensitivity deteriorates because the reflection layer has too good heat releasing efficiency. In contrast, when the reflection layer is too thin, the overwriting properties deteriorate although the recording sensitivity is good.

A first embodiment of the information record/reproduction apparatus utilizing the information recording method of the present invention will be explained.

In the first embodiment, the last heating pulse Br has a pulse width of from 0.5T to 0.9T and the last cooling pulse Cr has a pulse width of from 0.7T to 1.3T when record marks having a mark length of from 6T to 14T are recorded. By controlling the pulse widths, the resultant record marks have a clear rear edge even when high speed recording is performed, resulting in decrease of jitters of the reproduced signals.

Then a second embodiment of the information record/reproduction apparatus will be explained. In the second embodiment, when record marks having a mark length of from 6T to 14T are recorded, the rear heating pulses B have a pulse width of from 0.8T to 1.4T, and the first heating pulse A has a pulse width of from 0.7T to 1.3T under the pulse conditions mentioned above in the first embodiment.

Since marks having a mark length of from 6T to 14T are formed by irradiating the rear heating pulses B having such a pulse width as mentioned above, the resultant record marks have a clear shape without narrowing. This is because the central portion of the record marks having such a mark length are recorded using rear heating pulses having a wide pulse width even when high speed recording is performed.

In addition, since the first heating pulse A has such a pulse width as mentioned above when the marks having a mark length of from 6T to 14T are recorded, the resultant record marks have a clear front edge even in high speed recording, resulting in decrease of jitters of the reproduction signals.

Then the third embodiment will be explained. In the third embodiment, when record marks having a mark length of 3T are recorded, the first heating pulse A has a pulse width of from 0.8T to 1.4T, and the last cooling pulse Cr has a pulse width of from 1.1T to 1.9T under the pulse conditions mentioned above in the first and second embodiments.

Since the first heating pulse A has such a pulse width as mentioned above when marks having a mark length of 3T are formed, the resultant record marks have a clear front edge even in high speed recording, resulting in decrease of jitters of the reproduction signals.

In addition, since the last cooling pulse Cr has such a pulse width as mentioned above when the marks having a mark length of 3T are recorded, the resultant record marks have a clear rear edge even in high speed recording, resulting in decrease of jitters of the reproduction signals.

Then the fourth embodiment will be explained. In the fourth embodiment, when record marks having a mark length of 4T are recorded, the first heating pulse A has a pulse width of from 0.6T to 1.4T, the last heating pulse Br has a pulse width of from 0.1T to 0.8T, and the last cooling pulse Cr has a pulse width of from 0.8T to 1.7T under the pulse conditions mentioned above in the first, second and third embodiments.

Since the first heating pulse A has such a pulse width as mentioned above even when marks having a mark length of 4T are formed, the resultant record marks have a clear front edge even in high speed recording, resulting in decrease of jitters of the reproduction signals.

In addition, since the last heating pulse Br has such a pulse width as mentioned above when the marks having a mark length of 4T are recorded, the resultant record marks have a clear rear edge even in high speed recording, resulting in decrease of jitters of the reproduction signals.

In addition, since the last cooling pulse Cr has such a pulse width as mentioned above when the marks having a mark length of 4T are recorded, the resultant record marks have a clear rear edge even in high speed recording, resulting in decrease of jitters of the reproduction signals.

Then the fifth embodiment will be explained. In the fifth embodiment, when record marks having a mark length of 5T are recorded, the first heating pulse A has a pulse width of from 0.5T to 1.6T, the last heating pulse Br has a pulse width of from 0.6T to 1.2T, and the last cooling pulse Cr has a pulse width of from 0.7T to 1.6T under the pulse conditions mentioned above in the first, second, third and fourth embodiments.

Since the first heating pulse A has such a pulse width as mentioned above when marks having a mark length of 5T are formed, the resultant record marks have a clear front edge even in high speed recording, resulting in decrease of jitters of the reproduction signals.

In addition, since the last heating pulse Br has such a pulse width as mentioned above when the marks having a mark length of 5T are recorded, the resultant record marks have a clear rear edge even in high speed recording, resulting in decrease of jitters of the reproduction signals.

In addition, since the last cooling pulse Cr has such a pulse width as mentioned above when the marks having a mark length of 5T are recorded, the resultant record marks have a clear rear edge even in high speed recording, resulting in decrease of jitters of the reproduction signals.

Then the sixth embodiment will be explained. In the sixth embodiment, the ratio (Pe/Pw) of the erasing power (Pe) to the recording power (Pw) is set so as to be from 0.4 to 0.7 in addition to the recording conditions mentioned above in the first to fifth embodiments.

Since recording/erasing is performed while setting the erasing power and recording power so as to satisfy the ratio mentioned above, the resultant marks have clear edges even when recording is repeatedly performed, resulting in decrease of the reproduction signals.

Then the seventh embodiment will be explained. In the seventh embodiment, the recording layer of the optical recording medium has a formula of Ge$\alpha$Ga$\beta$Sb$\gamma$Te100-$\alpha$-$\beta$-$\gamma$, wherein $\alpha$ is a number of from 1 to 5 in units of atomic percent, $\beta$ is a number of from 1 to 5 in units of atomic percent, and $\gamma$ is a number of from 70 to 81 in units of atomic percent, in addition to the recording conditions mentioned above in the sixth embodiment.

Since the recording layer has such a formula as mentioned above, information can be repeatedly recorded in a melt-erase mode even at a high recording speed of from 14 to 17.5 m/s. In this case, jitters of the reproduced signals can be decreased.

Then the eighth embodiment will be explained. In the eighth embodiment, the upper limit recrystallization linear speed, below which the recording layer heated by laser light having an erasing power of Pe recrystallizes is from 14 m/s to 20 m/s.

Since the recording layer has such a property, information can be well-recorded even at a high recording speed of from 14 to 17.5 m/s, i.e., at a speed four to five times the reproduction speed of DVD-ROMs.

The ninth embodiment will be explained. In the ninth embodiment, the recording layer of the optical recording medium has such a property as to crystallize at a temperature of from 160 to 210° C. when being heated at a heating speed of 10° C./min.

Since the recording layer has such a property, information can be well-recorded even at a high recording speed of from 14 to 17.5 m/s, i.e., at a speed four to five times that of the reproduction speed of DVD-ROMs.

Then the tenth embodiment of the present invention will be explained. In the tenth embodiment, the first dielectric layer has a thickness of from 20 nm to 250 nm; the recording layer has a thickness of from 10 nm to 30 nm; the second dielectric layer has a thickness of from 10 nm to 40 nm; the third dielectric layer has a thickness of from 2 nm to 20 nm; and the reflection layer has a thickness of from 30 nm to 250 nm.

When each of the layers has such a thickness as mentioned above, information can be well-recorded even at a high speed.

Having generally described this invention, further understanding can be obtained by reference to certain specific examples which are provided herein for the purpose of illustration only and are not intended to be limiting.

EXAMPLES

Example 1

In the first embodiment of the information record/reproduction apparatus, recording data are recorded in a phase change recording medium while applying laser light having waveform as illustrated in FIGS. 2 and 3. The resultant marks have a predetermined mark length even when the record channel clock is highly frequented.

When a mark having a shortest mark length of 3T is recorded, multi-pulse laser light constituted of a first heating pulse A having a pulse width of 1.0T, and a last cooling pulse Cr having a pulse width of 1.4T irradiates the optical recording medium.

When a mark having a mark length of 4T is recorded, multi-pulse laser light constituted of a first heating pulse A having a pulse width of 1.0T, a rear cooling pulse C1 having a pulse width of 1.0T, a last heating pulse Br having a pulse width of 0.5T and a last cooling pulse Cr having a pulse width of 1.3T irradiates the optical recording medium.

When a mark having a mark length of 5T is recorded, multi-pulse laser light constituted of a first heating pulse A having a pulse width of 1.0T, a rear cooling pulse C1 having a pulse width of 1.5T, a last heating pulse Br having a pulse width of 0.9T and a last cooling pulse Cr having a pulse width of 1.1T irradiates the optical recording medium.

When a mark having a mark length of 6T is recorded, multi-pulse laser light constituted of a first heating pulse A having a pulse width of 1.0T, rear cooling pulses C1 and C2 having a pulse width of 1.0T, a rear heating pulse B1 having a pulse width of 1.0T, a last heating pulse Br having a pulse width of 0.7T and a last cooling pulse Cr having a pulse width of 1.0T irradiates the optical recording medium.

When a mark having a mark length of 7T is recorded, multi-pulse laser light constituted of a first heating pulse A having a pulse width of 1.0T, a rear cooling pulse C1 having a pulse width of 1.5T, a rear cooling pulse C2 having a pulse width of 1.3T, a rear heating pulse B1 having a pulse width of 1.0T, a last heating pulse Br having a pulse width of 0.7T and a last cooling pulse Cr having a pulse width of 1.0T irradiates the optical recording medium.

When a mark having a mark length of 8T is recorded, multi-pulse laser light constituted of a first heating pulse A having a pulse width of 1.0T, rear cooling pulses C1, C2 and C3 each having a pulse width of 1.0T, rear heating pulses B1 and B2 each having a pulse width of 1.0T, a last heating pulse Br having a pulse width of 0.7T and a last cooling pulse Cr having a pulse width of 1.0T irradiates the optical recording medium.

When a mark having a mark length of 9T is recorded, multi-pulse laser light constituted of a first heating pulse A having a pulse width of 1.0T, a rear cooling pulse C1 having a pulse width of 1.5T, a rear cooling pulse C2 having a pulse width of 1.0T, a rear cooling pulse C3 having a pulse width of 1.3T, rear heating pulses B1 and B2 each having a pulse width of 1.0T, a last heating pulse Br having a pulse width of 0.7T and a last cooling pulse Cr having a pulse width of 1.0T irradiates the optical recording medium.

When a mark having a mark length of 10T is recorded, multi-pulse laser light constituted of a first heating pulse A having a pulse width of 1.0T, rear cooling pulses C1, C2, C3 and C4 each having a pulse width of 1.0T, rear heating pulses B1, B2 and B3 each having a pulse width of 1.0T, a last heating pulse Br having a pulse width of 0.7T and a last cooling pulse Cr having a pulse width of 1.0T irradiates the optical recording medium.

When a mark having a mark length of 11T is recorded, multi-pulse laser light constituted of a first heating pulse A having a pulse width of 1.0T, a rear cooling pulse C1 having a pulse width of 1.5T, rear cooling pulses C2 and C3 each having a pulse width of 1.0T, a rear cooling pulse C4 having a pulse width of 1.3T, rear heating pulses B1, B2 and B3 each having a pulse width of 1.0T, a last heating pulse Br having a pulse width of 0.7T and a last cooling pulse Cr having a pulse width of 1.0T irradiates the optical recording medium.

When a mark having a mark length of 14T is recorded, multi-pulse laser light constituted of a first heating pulse A having a pulse width of 1.0T, rear cooling pulses C1, C2, C3, C4, C5 and C6 each having a pulse width of 1.0T, rear heating pulses B1, B2, B3, B4 and B5 each having a pulse width of 1.0T, a last heating pulse Br having a pulse width of 0.7T and a last cooling pulse Cr having a pulse width of 1.0T irradiates the optical recording medium.

The optical recording medium used in Example 1 has a constitution such that information recorded in the recording medium can also be reproduced by an information reproduction method for DVD-ROMs.

The method for preparing the optical recording medium will be explained. A polycarbonate disc substrate having a diameter of 12 cm and a thickness of 0.6 mm was used as the substrate. In addition, a groove was previously formed on the substrate at a pitch of 0.74 $\mu$m. The polycarbonate substrate was subjected to a dehydration treatment at a high temperature. Then a first dielectric layer, a recording layer, a second dielectric layer, a third dielectric layer and a reflection layer were overlaid on the substrate in this order by sputtering.

When the first dielectric layer was formed, a material ZnS—SiO$_2$ was used as a target. The thickness of the resultant first dielectric layer was 180 nm.

The recording layer was formed while an alloy Ge$_3$Ga$_5$Sb$_{75}$Te$_{17}$ (atomic %) was used as a target. Sputtering was performed under conditions of 3×10$^{-3}$ Torr (i.e., 0.4 Pa) in the argon gas pressure and 300 mW (i.e., 0.3 W) in the RF power. The thickness of the recording layer was 20 nm.

The second dielectric layer was formed while a material ZnS—SiO$_2$ was used as a target. The thickness of the second dielectric layer was 20 nm.

The third dielectric layer was formed while a material SiC was used as a target. The thickness of the third dielectric layer was 6 nm.

The reflection layer was formed while a silver alloy was used as a target. The thickness of the reflection layer was 120 nm.

In addition, an organic protective layer was formed on the reflection layer by coating an ultraviolet-crosslinking acrylic resin using a spinner so as to have a thickness of from 5 to 10 $\mu$m. The acrylic resin was crosslinked by ultraviolet rays.

In addition, another polycarbonate disc having a diameter of 12 cm and a thickness of 0.6 mm was adhered thereto using an adhesive sheet. The recording layer of the thus prepared optical recording medium was exposed to laser light to be initially crystallized.

In Example 1, a pickup emitting laser light having a wavelength of 660 nm and a NA (numerical aperture of lens) of 0.65 was used for reproduce the recorded information. Recording was performed using a pulse modulation method. The modulation method used is an EFM method (i.e., Eight to Sixteen Modulation). The ratio (Pe/Pw) of the erasing power (Pe) to the recording power (Pw) was 0.5. The reproduction power was 0.7 mW (i.e., 0.0007 W). Recording and overwriting were performed at a line density of 0.267 $\mu$m/bit. Jitter a was determined by measuring "data to clock". Namely, jitter was determined by measuring the deviation of the reproduction signals (i.e., data) from the standard clock cycle T (i.e., clock). The record speed and reproduction speed were 17.5 m/s and 3.5 m/s, respectively.

As a result, a good result such that a value σ/Tw, i.e., data to clock jitter a standardized by the window width Tw, was 10% with cross talk (i.e., signals in a track are evaluated while signals have been recorded in the adjacent tracks) was obtained. In addition, the modulation of the reproduction signals and the reflectance of the optical recording medium were 65% and 18.5%. The modulation is defined as a ratio (I14/I14 top) of the signal width (I14) to the signal intensity (I14 top) of the top of the longest mark 14T. Further, even after overwriting was performed 1000 times, the standardized jitter (σ/Tw) was 11%, i.e., increase of jitter can be prevented.

In addition, when recording was performed at a speed less than 17.5 m/s, good results could be obtained.

Comparative Example 1

Figure 19:
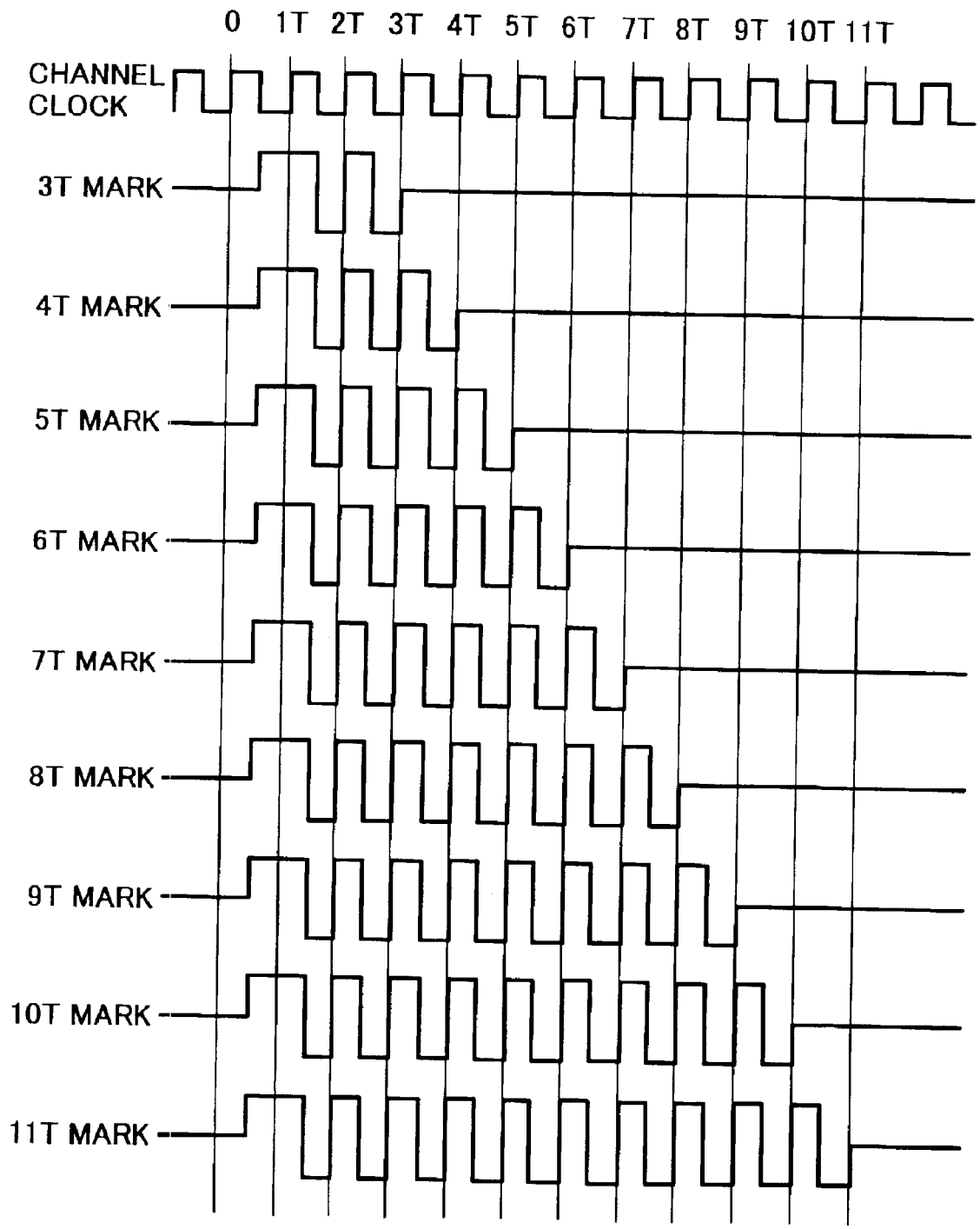
FIG. 19 is a diagram illustrating typically examples of the waveforms of a multi-pulse laser light train in which a pair of a heating pulse and a cooling pulse are added whenever the mark length of record data increases by 1T.

Information was recorded at a speed of 17.5 m/s using an information record/reproduction apparatus which applies multi-pulse laser light as illustrated in FIG. 19 in which a pair of a heating pulse and a cooling pulse is added when the mark length increases by 1T (hereinafter referred to as a 1T strategy).

As a result, the initial jitter σ/Tw and modulation were 15% and 30%, respectively. In addition, overwriting was not performed.

At the present time, the upper limit of the power at which a laser diode can stably emit light having a wavelength of 660 nm is 15 mW (i.e., 0.015W) when measured on the surface of an optical recording medium. When recording is performed on an optical recording medium at a high speed of 17.5 m/s using 660 nm laser light and 1T strategy, the optical recording medium cannot be sufficiently heated or cooled (i.e., the power is insufficient). Therefore, the modulation decreases and the jitter deteriorates.

In contrast, even when a laser diode of 660 nm is used, by using the method of Example 1 in which laser light having waveforms as illustrated in FIG. 2 irradiates, the wave length of the pulses of the laser light corresponding to the front and rear edge portions of marks is wide, and thereby the jitter of reproduced signals can be decreased and the modulation can be increased.

Example 2

Figure 4:
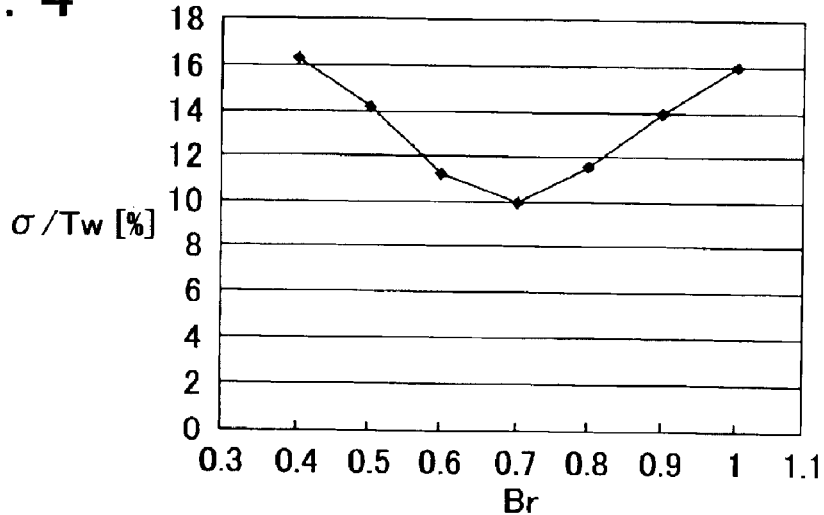
FIG. 4 is a graph illustrating the relationship between the pulse width (0.4 to 1.0T) of the last heating pulse Br and the jitter characteristic ($\sigma$/Tw) when a record mark having a mark length of from 6T to 14T is recorded in Example 1.

The procedure for recording and reproduction in Example 1 was repeated except that the wavelength of the last heating pulse Br was changed from 0.4T to 1.0T when marks having a mark length of from 6T to 14T were recorded. The results (σ/Tw) are shown in FIG. 4. As can be understood from FIG. 4, when the pulse width of the last heating pulse Br is from 0.5T to 0.9T, the jitter (σ/Tw) is not greater than 14%. To the contrary, when the last heating pulse Br is less than 0.5T or greater than 0.9T, the rear edges of the resultant marks become unclear, resulting in deterioration of jitter.

Accordingly, when marks having a mark length of from 6T to 14T are recorded, the pulse width of the last heating pulse Br is set so as to be from 0.5T to 0.9T to form marks having a clear rear edge, resulting in decrease of jitter of reproduction signals.

Example 3

Figure 5:
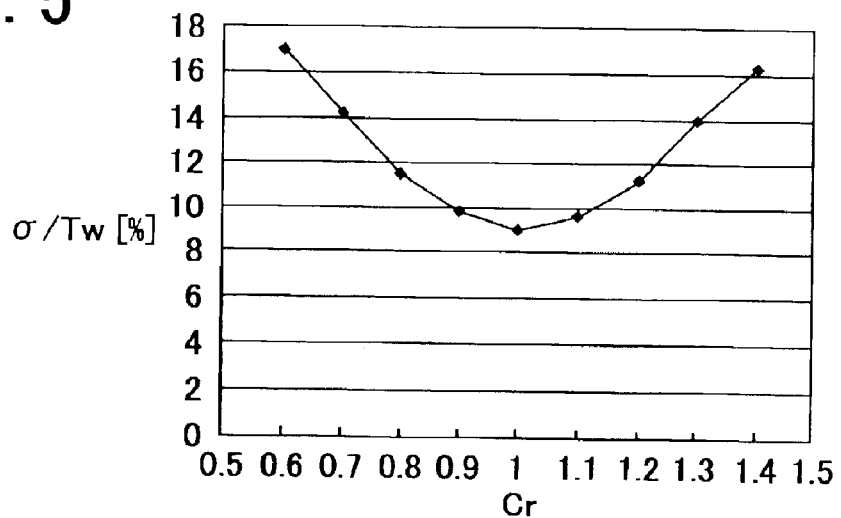
FIG. 5 is a graph illustrating the relationship between the pulse width (0.6 to 1.4T) of the last cooling pulse Cr and the jitter characteristic (σ/Tw) when a record mark having a mark length of from 6T to 14T is recorded in Example 1.

The procedure for recording and reproduction in Example 1 was repeated except that the wavelength of the last cooling pulse Cr was changed from 0.6T to 1.4T when marks having a mark length of from 6T to 14T were recorded. The results (σ/Tw) are shown in FIG. 5. As can be understood from FIG. 5, when the pulse width of the last cooling pulse Cr is from 0.7T to 1.3T, the jitter (σ/Tw) is not greater than 14%. To the contrary, when the last cooling pulse Cr is less than 0.7T or greater than 1.3T, the rear edges of the resultant marks become unclear, resulting in deterioration of jitter.

Accordingly, when marks having a mark length of from 6T to 14T are recorded, the pulse width of the last cooling pulse Cr is set so as to be from 0.7T to 1.3T to form marks having a clear rear edge, resulting in decrease of jitter of reproduction signals.

Example 4

Figure 6:
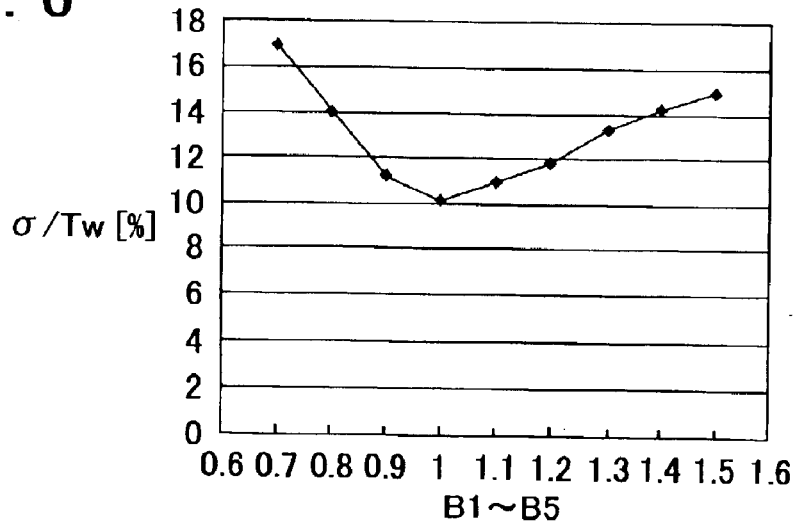
FIG. 6 is a graph illustrating the relationship between the pulse width (0.7 to 1.5T) of the rear heating pulses B1–B5 and the jitter characteristic (σ/Tw) when a record mark having a mark length of from 6T to 14T is recorded in Example 1.

The procedure for recording and reproduction in Example 1 was repeated except that the wavelength of the rear heating pulses B1 to B5 were changed from 0.7T to 1.5T when marks having a mark length of from 6T to 14T were recorded. The results (σ/Tw) are shown in FIG. 6. As can be understood from FIG. 6, when the pulse width of the rear heating pulses B1 to B5 are from 0.8T to 1.4T, the jitter (σ/Tw) is not greater than 14%. To the contrary, when the pulse width of the rear heating pulses B1 to B5 is less than 0.8T, the resultant marks narrow due to insufficient power, resulting in deterioration of jitter.

In contrast, when the pulse width of the rear heating pulse B1 to B5 is greater than 1.4T, the resultant marks narrow due to insufficient cooling time, resulting in deterioration of jitter.

Accordingly, when marks having a mark length of from 6T to 14T are recorded, the pulse width of the rear heating pulses B1 to B5 is set so as to be from 0.8T to 1.4T to prevent narrowing of recorded marks, resulting in decrease of jitter of reproduction signals.

Example 5

Figure 7:
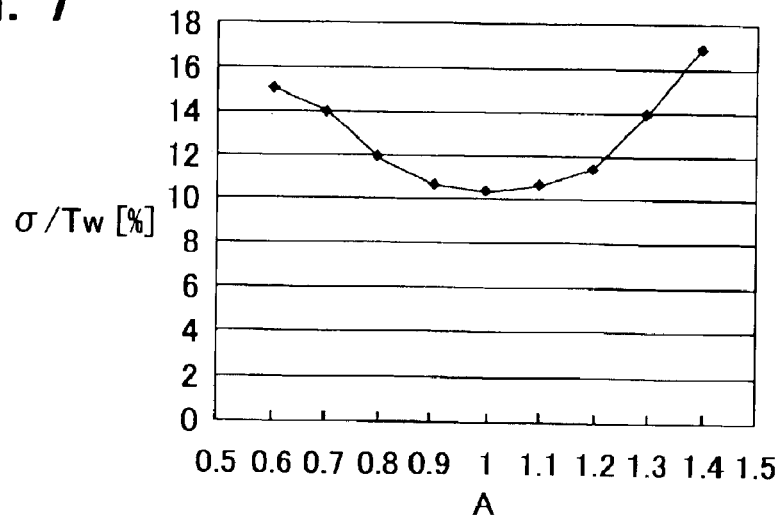
FIG. 7 is a graph illustrating the relationship between the pulse width (0.6 to 1.4T) of the first heating pulse A and the jitter characteristic (σ/Tw) when a record mark having a mark length of from 6T to 14T is recorded in Example 1.

The procedure for recording and reproduction in Example 1 was repeated except that the wavelength of the first heating pulse A was changed from 0.6T to 1.4T when marks having a mark length of from 6T to 14T were recorded. The results (σ/Tw) are shown in FIG. 7. As can be understood from FIG. 7, when the pulse width of the first heating pulse A is from 0.7T to 1.3T, the jitter (σ/Tw) is not greater than 14%. To the contrary, when the pulse width of the first heating pulse A is less than 0.7T, the front edge of the resultant marks narrows due to insufficient power, resulting in deterioration of jitter. When the pulse width of the first heating pulse A is greater than 1.3T, the front edge of the resultant marks narrows due to insufficient cooling time, resulting in deterioration of jitter.

Accordingly, when marks having a mark length of from 6T to 14T are recorded, the pulse width of the first heating pulse A is set so as to be from 0.7T to 1.3T to prevent narrowing of the front edges of the marks, resulting in decrease of jitter of reproduction signals.

Example 6

Figure 8:
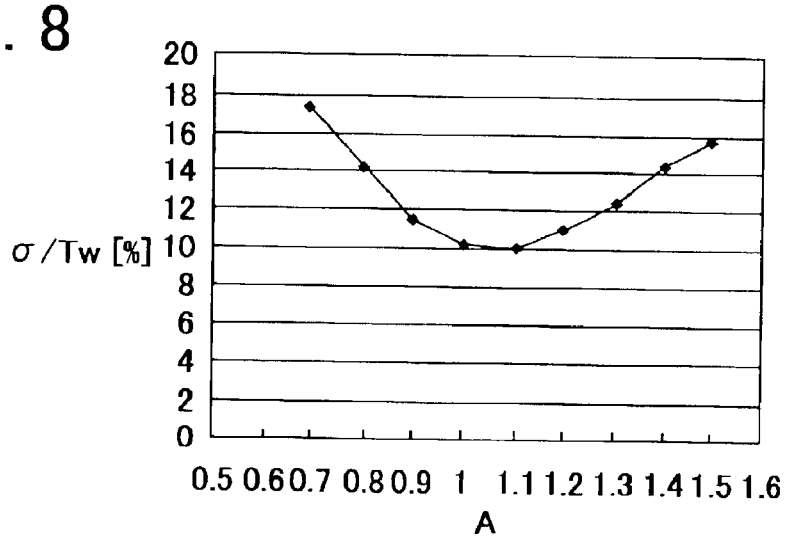
FIG. 8 is a graph illustrating the relationship between the pulse width (0.7 to 1.5T) of the first heating pulse A and the jitter characteristic (σ/Tw) when a record mark having a mark length of 3T is recorded in Example 1.

The procedure for recording and reproduction in Example 1 was repeated except that the wavelength of the first heating pulse A was changed from 0.7T to 1.5T when marks having a mark length of 3T were recorded. The results (σ/Tw) are shown in FIG. 8. As can be understood from FIG. 8, when the pulse width of the first heating pulse A is from 0.8T to 1.4T, the jitter (σ/Tw) is not greater than 14%. To the contrary, when the pulse width of the first heating pulse A is less than 0.8T, the front edge of the resultant marks narrows due to insufficient power, resulting in deterioration of jitter. When the pulse width of the first heating pulse A is greater than 1.5T, the front edge of the resultant marks narrows due to insufficient cooling time, resulting in deterioration of jitter.

Accordingly, when marks having a mark length of 3T are recorded, the pulse width of the first heating pulse A is set so as to be from 0.8T to 1.4T to prevent narrowing of the front edges of the marks, resulting in decrease of jitter of reproduction signals.

Example 7

Figure 9:
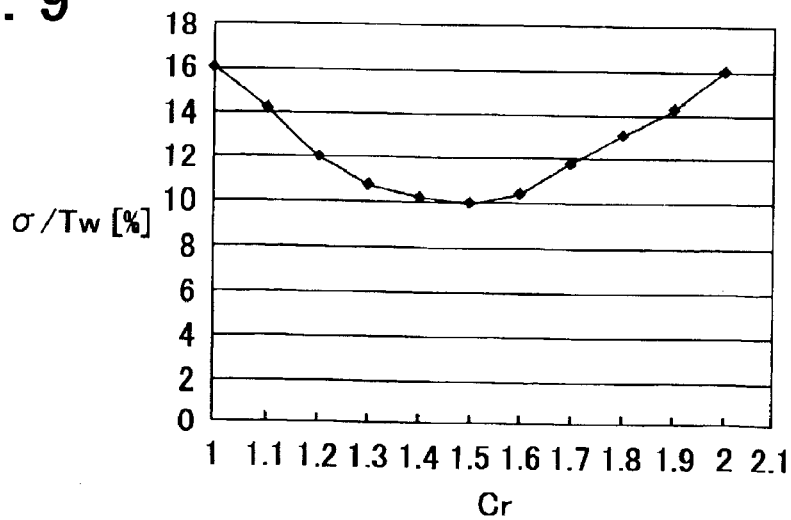
FIG. 9 is a graph illustrating the relationship between the pulse width (1.0 to 2.0T) of the last cooling pulse Cr and the jitter characteristic (σ/Tw) when a record mark having a mark length of 3T is recorded in Example 1.

The procedure for recording and reproduction in Example 1 was repeated except that the wavelength of the last cooling pulse Cr was changed from 1.0T to 2.0T when marks having a mark length of 3T were recorded. The results ($\sigma$/Tw) are shown in FIG. 9. As can be understood from FIG. 9, when the pulse width of the last cooling pulse Cr is from 1.1T to 1.9T, the jitter ($\sigma$/Tw) is not greater than 14%. To the contrary, when the pulse width of the last cooling pulse Cr is less than 1.1T or greater than 1.9T, the resultant marks have an unclear rear edge, resulting in deterioration of jitter.

Accordingly, when marks having a mark length of 3T are recorded, the pulse width of the last cooling pulse Cr is set so as to be from 1.1T to 1.9T to form marks having a clear rear edge, resulting in decrease of jitter of reproduction signals.

Example 8

Figure 10:
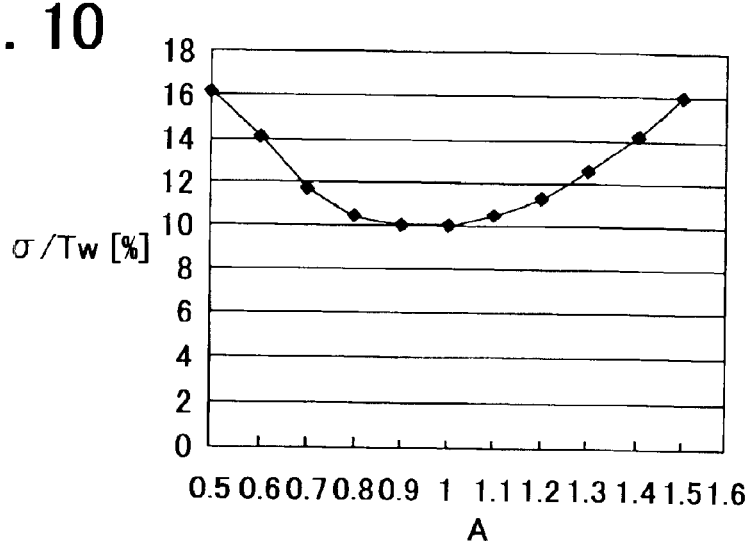
FIG. 10 is a graph illustrating the relationship between the pulse width (0.5 to 1.5T) of the first heating pulse A and the jitter characteristic (σ/Tw) when a record mark having a mark length of 4T is recorded in Example 1.

The procedure for recording and reproduction in Example 1 was repeated except that the wavelength of the first heating pulse A was changed from 0.5T to 1.5T when marks having a mark length of 4T were recorded. The results ($\sigma$/Tw) are shown in FIG. 10. As can be understood from FIG. 10, when the pulse width of the first heating pulse A is from 0.6T to 1.4T, the jitter ($\sigma$/Tw) is not greater than 14%. To the contrary, when the pulse width of the first heating pulse A is less than 0.6T, the front edge of the resultant marks narrows due to insufficient power, resulting in deterioration of jitter. When the pulse width of the first heating pulse A is greater than 1.4T, the front edge of the resultant marks narrows due to insufficient cooling time, resulting in deterioration of jitter.

Accordingly, when marks having a mark length of 4T are recorded, the pulse width of the first heating pulse A is set so as to be from 0.6T to 1.4T to prevent narrowing of the front edges of the marks, resulting in decrease of jitter of reproduction signals.

Example 9

Figure 11:
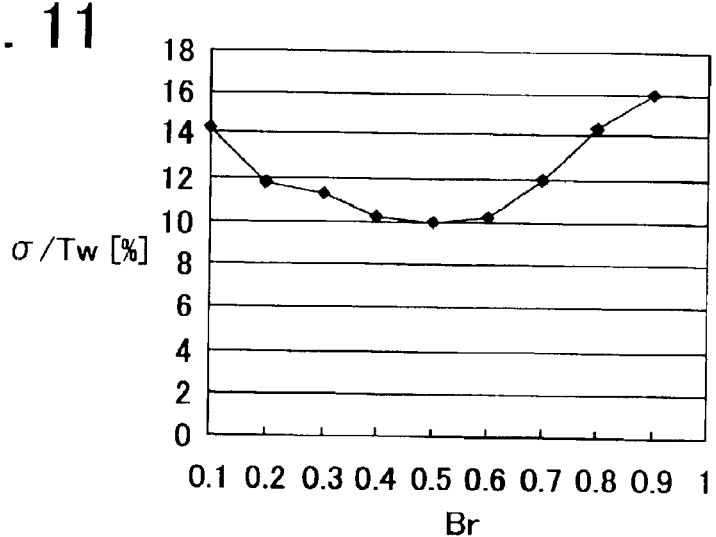
FIG. 11 is a graph illustrating the relationship between the pulse width (0.1 to 0.9T) of the last heating pulse Br and the jitter characteristic (σ/Tw) when a record mark having a mark length of 4T is recorded in Example 1.

The procedure for recording and reproduction in Example 1 was repeated except that the wavelength of the last heating pulse Br was changed from 0.1T to 0.9T when marks having a mark length of 4T were recorded. The results ($\sigma$/Tw) are shown in FIG. 1. As can be understood from FIG. 11, when the pulse width of the last heating pulse Br is from 0.1T to 0.8T, the jitter ($\sigma$/Tw) is not greater than 14%. To the contrary, when the pulse width of the last heating pulse Br is less than 0.1T or greater than 0.9T, the resultant marks have an unclear rear edge, resulting in deterioration of jitter.

Accordingly, when marks having a mark length of 4T are recorded, the pulse width of the last heating pulse Br is set so as to be from 0.1T to 0.8T to form marks having a clear rear edge, resulting in decrease of jitter of reproduction signals.

Example 10

Figure 12:
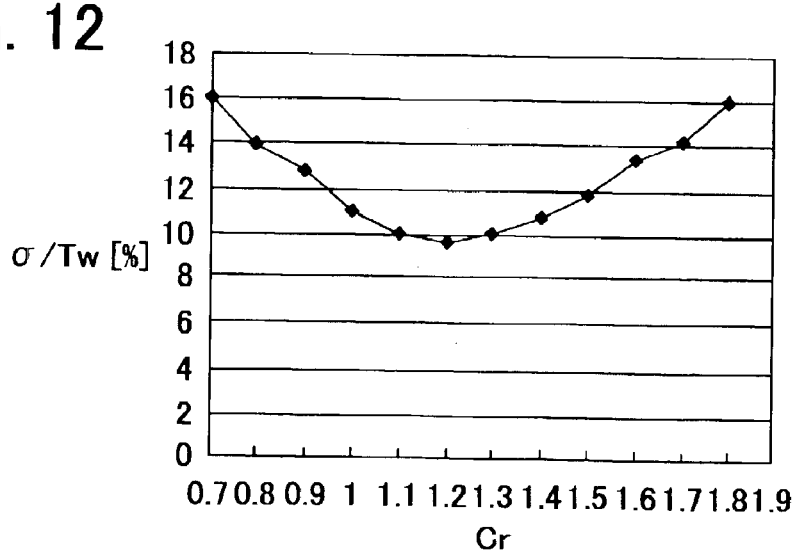
FIG. 12 is a graph illustrating the relationship between the pulse width (0.7 to 1.8T) of the last cooling pulse Cr and the jitter characteristic (σ/Tw) when a record mark having a mark length of 4T is recorded in Example 1.

The procedure for recording and reproduction in Example 1 was repeated except that the wavelength of the last cooling pulse Cr was changed from 0.7T to 1.8T when marks having a mark length of 4T were recorded. The results ($\sigma$/Tw) are shown in FIG. 12. As can be understood from FIG. 12, when the pulse width of the last cooling pulse Cr is from 0.8T to 1.7T, the jitter ($\sigma$/Tw) is not greater than 14%. To the contrary, when the pulse width of the last cooling pulse Cr is less than 0.8T or greater than 1.7T, the resultant marks have an unclear rear edge, resulting in deterioration of jitter.

Accordingly, when marks having a mark length of 4T are recorded, the pulse width of the last cooling pulse Cr is set so as to be from 0.8T to 1.7T to form marks having a clear rear edge, resulting in decrease of jitter of reproduction signals.

Example 11

Figure 13:
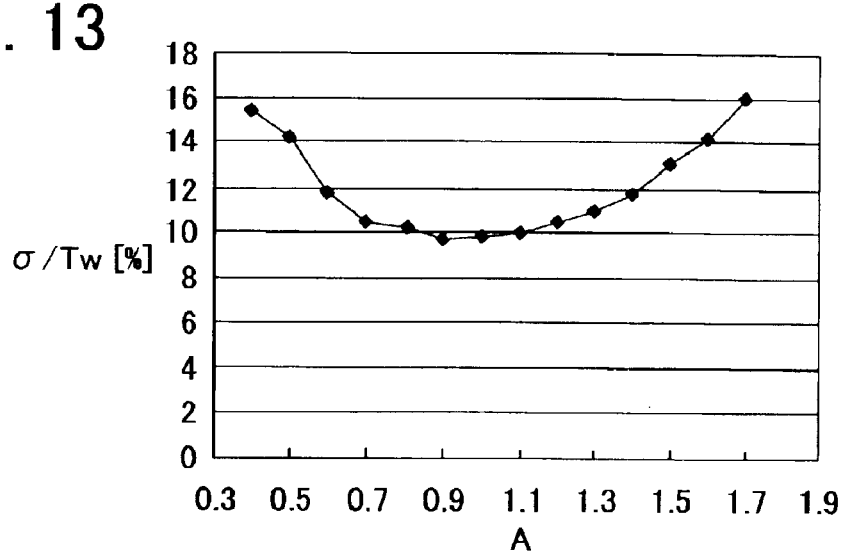
FIG. 13 is a graph illustrating the relationship between the pulse width (0.4 to 1.7T) of the first heating pulse A and the jitter characteristic (σ/Tw) when a record mark having a mark length of γT is recorded in Example 1.

The procedure for recording and reproduction in Example 1 was repeated except that the wavelength of the first heating pulse A was changed from 0.4T to 1.7T when marks having a mark length of 5T were recorded. The results ($\sigma$/Tw) are shown in FIG. 13. As can be understood from FIG. 13, when the pulse width of the first heating pulse A is from 0.5T to 1.6T, the jitter ($\sigma$/Tw) is not greater than 14%. To the contrary, when the pulse width of the first heating pulse A is less than 0.5T, the front edge of the resultant marks narrows due to insufficient power, resulting in deterioration of jitter. When the pulse width of the first heating pulse A is greater than 1.6T, the front edge of the resultant marks narrows due to insufficient cooling time, resulting in deterioration of jitter.

Accordingly, when marks having a mark length of 5T are recorded, the pulse width of the first heating pulse A is set so as to be from 0.5T to 1.6T to prevent narrowing of the front edges of the marks, resulting in decrease of jitter of reproduction signals.

Example 12

Figure 14:
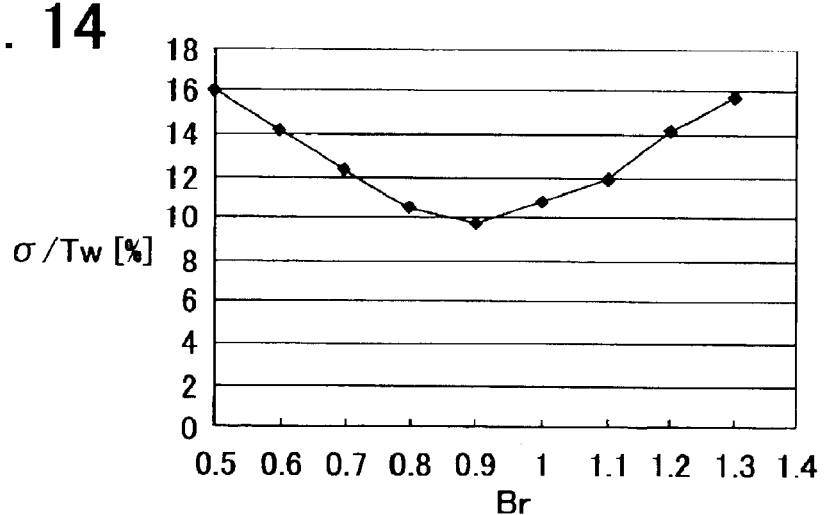
FIG. 14 is a graph illustrating the relationship between the pulse width (0.5 to 1.3T) of the last heating pulse Br and the jitter characteristic (σ/Tw) when a record mark having a mark length of γT is recorded in Example 1.

The procedure for recording and reproduction in Example 1 was repeated except that the wavelength of the last heating pulse Br was changed from 0.5T to 1.3T when marks having a mark length of 5T were recorded. The results ($\sigma$/Tw) are shown in FIG. 14. As can be understood from FIG. 14, when the pulse width of the last heating pulse Br is from 0.6T to 1.2T, the jitter ($\sigma$/Tw) is not greater than 14%. To the contrary, when the pulse width of the last heating pulse Br is less than 0.6T or greater than 1.2T, the resultant marks have an unclear rear edge, resulting in deterioration of jitter.

Accordingly, when marks having a mark length of 5T are recorded, the pulse width of the last heating pulse Br is set so as to be from 0.6T to 1.2T to form marks having a clear rear edge, resulting in decrease of jitter of reproduction signals.

Example 13

Figure 15:
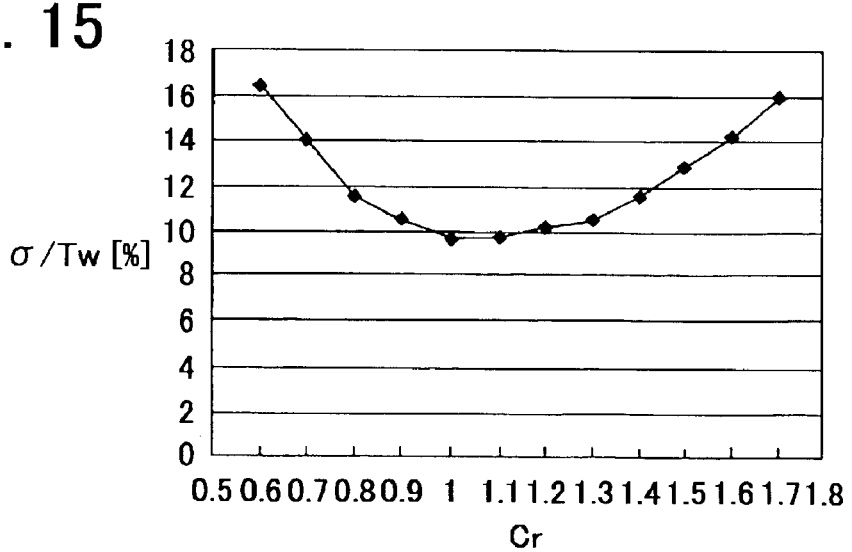
FIG. 15 is a graph illustrating the relationship between the pulse width (0.6 to 1.7T) of the last cooling pulse Cr and the jitter characteristic (σ/Tw) when a record mark having a mark length of γT is recorded in Example 1.

The procedure for recording and reproduction in Example 1 was repeated except that the wavelength of the last cooling pulse Cr was changed from 0.6T to 1.7T when marks having a mark length of 5T were recorded. The results ($\sigma$/Tw) are shown in FIG. 15. As can be understood from FIG. 15, when the pulse width of the last cooling pulse Cr is from 0.7T to 1.6T, the jitter (σ/Tw) is not greater than 14%. To the contrary, when the pulse width of the last cooling pulse Cr is less than 0.7T or greater than 1.6T, the resultant marks have an unclear rear edge, resulting in deterioration of jitter.

Accordingly, when marks having a mark length of 5T are recorded, the pulse width of the last cooling pulse Cr is set so as to be from 0.7T to 1.6T to form marks having a clear rear edge, resulting in decrease of jitter of reproduction signals.

Example 14

Figure 16:
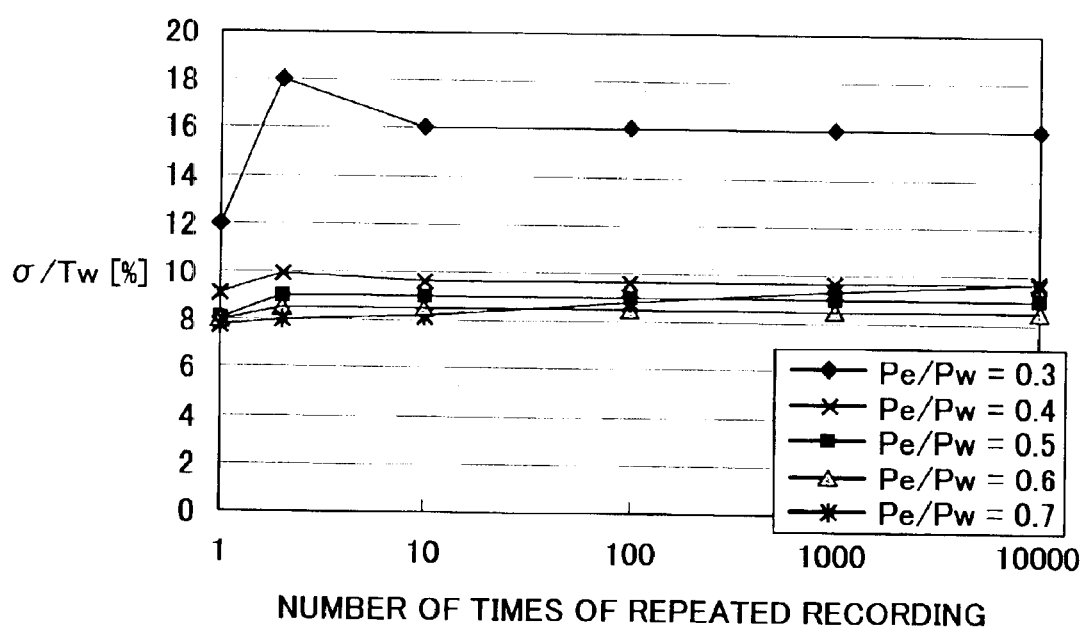
FIG. 16 is a graph illustrating the relationship between the ratio Pe/Pw of the erasing power (Pe) to the recording power (Pw) and the jitter characteristic when recording is repeatedly performed.
Figure 17:
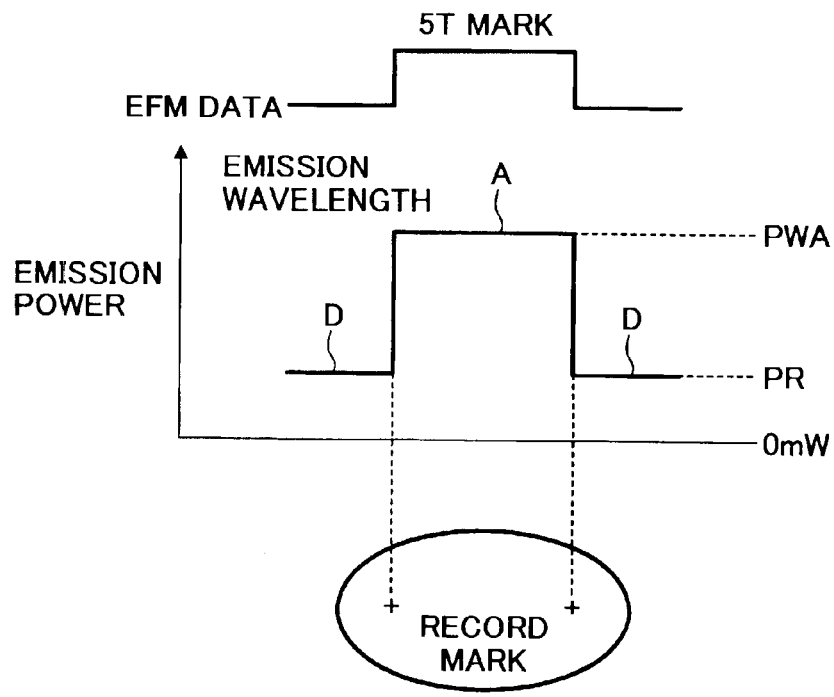
FIG. 17 is a diagram illustrating a typical waveform of a pulse for use in conventional single-pulse optical recording when a mark having a mark length of 5T is recorded in a phase change recording medium.
Figure 18:
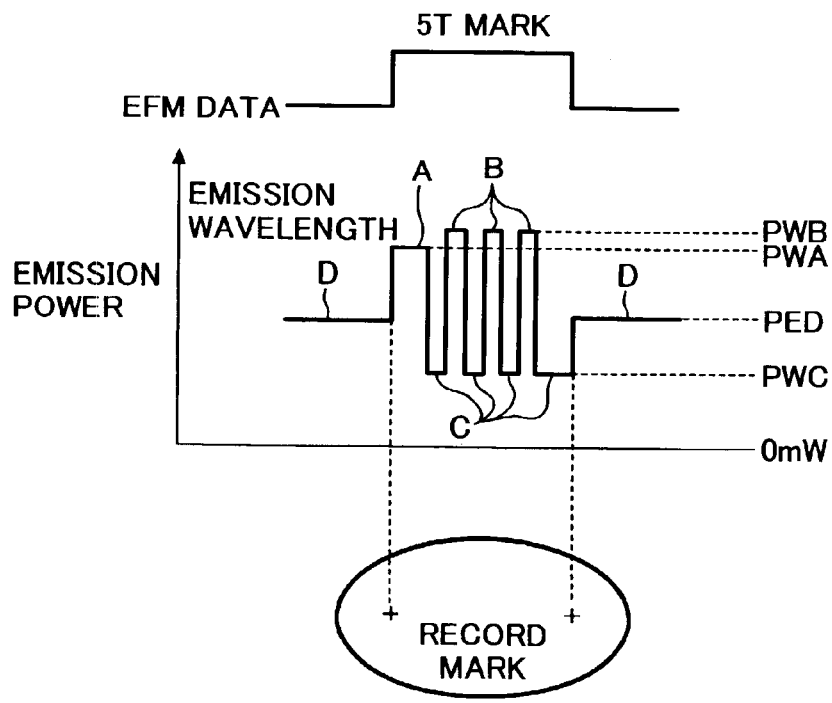
FIG. 18 is a diagram illustrating a typical waveform of a multi-pulse laser light train for use in conventional multi-pulse recording when a mark having a mark length of 5T is formed on a phase change recording medium, wherein the laser light has a multilevel recording power and is generated according to an EFM code.

The procedure for recording and reproduction in Example 1 was repeated except that the ratio (Pe/Pw) of the erasing power (Pe) to the recording power (Pw) was changed so as to be 0.3, 0.4, 0.5, 0.6 and 0.7. The jitter after repeated recording is shown in FIG. 16. As can be understood from FIG. 16, when the ratio (Pe/Pw) is 0.4 to 0.7, the jitter (σ/Tw) is not greater than 10% even after recording is repeated 1000 times. When the ratio (Pe/Pw) is 0.3, the jitter, particularly the initial jitter, is inferior to the jitter when the ratio is 0.4 to 0.7. In particular, when recording is repeated twice, the jitter seriously increases. In contrast, when the ratio (Pe/Pw) is not less than 0.8, the recording layer achieves an amorphous state because the erase power is too large.

The reason is considered to be that when the ratio is from 0.4 or 0.7, the recording layer is melted and then recrystallized (i.e., recording is performed in a melt-erase mode), but when the ratio is 0.3, the recording layer is not melted due to low erasing power and thereby the recording layer recrystallizes while maintaining a solid state. Namely, the recrystallization mode is different in both the cases, and thereby the jitter are different.

Accordingly, by setting the ratio (Pe/Pw) so as to be 0.4 to 0.7, marks having a clear edge can be formed even in high speed recording, resulting in decrease of jitter even after repeated use.

Examples 15 to 22 and Comparative Examples 2 to 5

The procedure for preparation of the optical recording medium in Example 1 was repeated except that the formula of the recording layer was changed as shown in Table 1. Information was repeatedly recorded in the resultant recording media under the following conditions:

Recording linear speed: 17.5 m/s

Recording power Pw: 15 mW (i.e., 0.015 W)

Erasing power Pe: 8 mW (i.e., 0.008 W)

The information-recorded optical recording media were evaluated as follows:

Each information-recorded optical recording medium was allowed to settle in an oven for 300 hours under the conditions 80° C. in temperature and 85% in relative humidity to determine jitters before and after the preservation test (i.e., jitter increasing rate; so-called archival increasing rate). In addition, the crystallization temperature and melting point of the film of each recording layer were measured at a temperature rising speed of 10° C./min.

Further, the repeatability (i.e., as to how many times information can be recorded therein with a jitter not greater than 14%) was evaluated. The results are shown in Table 2.

TABLE 1

| | Formula of the recording layer (atomic %) | | | |
|---|---|---|---|---|
| | Sb | Te | Ge | Ga |
| Example 15 | 76 | 18.1 | 3 | 2.9 |
| Example 16 | 77 | 15.6 | 2.9 | 4.5 |
| Example 17 | 72 | 18 | 5 | 5 |
| Example 18 | 76 | 16 | 5 | 3 |
| Example 19 | 79 | 14 | 4.5 | 2.5 |
| Example 20 | 73 | 21 | 3 | 3 |
| Example 21 | 77 | 15 | 4 | 4 |
| Example 22 | 72 | 23 | 1 | 4 |
| Comparative Example 2 | 85 | 5 | 5 | 5 |
| Comparative Example 3 | 67 | 20 | 4 | 9 |
| Comparative Example 4 | 68 | 17 | 10 | 5 |
| Comparative Example 5 | 76 | 21 | 0 | 3 |

TABLE 2

| | Repeat-Ability (times) | Crystallization temp. (° C.) | Jitter increasing rate | Initial crystallization | Melting point (° C.) |
|---|---|---|---|---|---|
| Ex. 15 | 12000 | 175 | 1.2 | Good | 545 |
| Ex. 16 | 10000 | 185 | 1.2 | Good | 530 |
| Ex. 17 | 11000 | 190 | 1.3 | Good | 550 |
| Ex. 18 | 12000 | 175 | 1.2 | Good | 535 |
| Ex. 19 | 12000 | 170 | 1.1 | Good | 540 |
| Ex. 20 | 11000 | 175 | 1.2 | Good | 550 |
| Ex. 21 | 10000 | 180 | 1.3 | Good | 540 |
| Ex. 22 | 8000 | 180 | 1.2 | Good | 535 |
| Comp. Ex. 2 | 300 | 170 | 8 | Good | 530 |
| Comp. Ex. 3 | 500 | 230 | 4 | Impossible | 530 |
| Comp. Ex. 4 | 1 | 180 | 3 | Good | 530 |
| Comp. Ex. 5 | 500 | 170 | 7 | Good | 530 |

In Examples 15 to 22 and Comparative Examples 2 to 5, the formula of the recording layer of the optical recording medium of Example 1 is changed such that the recording layer has a crystallization temperature of from 170 to 230° C. when measured at a temperature rising speed of 10° C./min.

As can be understood from Tables 1 and 2, the optical recording media have a good repeatability not less than 5000 times, and a good jitter property (a low jitter increasing rate not greater than 1.3%; i.e., jitter hardly increases even after the preservation test). In addition, the re-crystallization speed of the recording layers is not less than 14 m/s.

Further, information could be well-recorded in the optical recording media of Examples 15 to 22 even at a low speed less than 17.5 m/s.

In contrast, since Sb is included in the recording layer of the optical recording medium of Comparative Example 2 at a high content of 85 atomic %, the optical recording medium has a poor preservation property, and a poor repeatability.

Since Ga is included in the recording layer of the optical recording medium of Comparative Example 3 at a high content of 9 atomic %, the recording layer of the optical recording medium has a high crystallization temperature of 230° C., and thereby initial crystallization cannot be performed on the recording layer.

Since Ge is included in the recording layer of the optical recording medium of Comparative Example 4 at a high content of 10 atomic %, the crystallization speed is slow, specifically the recording layer has a low re-crystallization speed of 12 m/s. Therefore, when erasure is performed at a speed of 17.5 m/s, an amorphous region remains in the recording layer, resulting in deterioration of the repeated recording property.

Since Ge is not included in the recording layer of the optical recording medium of Comparative Example 5, the recording medium has poor preservability.

Thus, since the optical recording media of Examples 15 to 22 have a crystallization temperature of from 160° C. to 210° C. when measured at a temperature rising speed of 10° C./min, initialization can be easily performed and in addition the resultant optical recording media have a good preservation property.

Effects of the Present Invention

According to the information recording method of the present invention, by controlling each of the pulse width of the last heating pulse and last cooling pulse so as to fall in a specific range, marks having clear rear edges can be recorded even at a high recording speed, thereby preventing increase of jitter of reproduction signals.

In addition, by controlling each of the pulse widths of the rear heating pulses and first heating pulse so as to fall in a specific range when marks having a mark length of from 6T to 14T, a problem in that the central portion of the record marks having a mark length of from 6T to 14T narrows can be prevented, and in addition the front edge of the marks is clear even at a high recording speed, thereby preventing increase of jitter of reproduction signals.

By further controlling each of the pulse widths of the first heating pulse and last cooling pulse so as to fall in a specific range when marks having a mark length of 3T are recorded, the resultant marks with a mark length of 3T have a clear front edge and a clear rear edge even at a high recording speed, thereby preventing increase of jitter of reproduction signals.

By further controlling each of the pulse widths of the first heating pulse, last heating pulse and last cooling pulse so as to fall in a specific range when marks having a mark length of 4T are recorded, the resultant marks with a mark length of 4T have a clear front edge and a clear rear edge even at a high recording speed, thereby preventing increase of jitter of reproduction signals.

In addition, by further controlling each of the pulse widths of the first heating pulse, last heating pulse and last cooling pulse so as to fall in a specific range when marks having a mark length of 5T are recorded, the resultant marks with a mark length of 5T have a clear front edge and a clear rear edge even at a high recording speed, thereby preventing increase of jitter of reproduction signals.

Further, when the ratio (Pe/Pw) of the erasing power (Pe) to the recording power (Pw) is from 0.4 to 0.7, the resultant marks have clear edges, thereby preventing increase of jitter of production signals even after repeated use.

When the recording layer of the optical recording medium used has a specific formula, information can be repeatedly recorded in a melt-erase mode even at a high recording speed, thereby preventing increase of jitter of reproduction signals.

In addition, when the upper-limit of re-crystallization linear speed of the recording layer is in a specific range, information can be well-recorded therein even at a high recording speed of from 14 to 17.5 m/s, i.e., a speed 4 to 5 times the reproduction speed for DVD-ROMs.

When the recording layer has a specific crystallization temperature, the recording medium can be easily initialized and has good preservation stability.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2002-021361, filed on Jan. 30, 2002, the entire contents of which are herein incorporated by reference.

What is claimed is:

1. An information recording method comprising:

irradiating a phase-change recording layer of an optical recording medium with either a multi-pulse laser light train having a recording power of Pw or laser light having an erasing power Pe to allow the phase-change recording layer to reversibly achieve a crystal state and an amorphous state, thereby recording a mark having a mark length nT in the recording layer, wherein n is an integer of from 3 to 14 and T represents a clock cycle, wherein the multi-pulse laser light train has a constitution such that a heating pulse and a cooling pulse are alternated, wherein the number of heating pulses and the number of cooling pulses each increases by one when n increases by two, and wherein when n is from 6 to 14, a last heating pulse has a pulse width of from 0.5T to 0.9T and a last cooling pulse has a pulse width of from 0.7T to 1.5T.

2. The information recording method according to claim 1, wherein when n is from 6 to 14, a first heating pulse has a pulse width of from 0.7T to 1.3T and a rear heating pulse, which is located between the first heating pulse and the last heating pulse, has a pulse width off from 0.8T to 1.4T.

3. The information recording method according to claim 1, wherein when n is 3, the first heating pulse has a width of from 0.8T to 1.4T and the last cooling pulse has a width of from 1.1T to 1.9T.

4. The information recording method according to claim 1, wherein when n is 4, the first heating pulse has a width of from 0.6T to 1.4T, the last heating pulse has a width of from 0.1T to 0.8T and the last cooling pulse has a width of from 0.8T to 1.7T.

5. The information recording method according to claim 1, wherein when n is 5, the first heating pulse has a width of from 0.5T to 1.6T, the last heating pulse has a width of from 0.6T to 1.2T and the last cooling pulse has a width of from 0.7T to 1.6T.

6. The information recording method according to claim 1, wherein a ratio (Pe/Pw) of the erasing power (Pe) to the recording power (Pw) is from 0.4 to 0.7.

7. The information recording method according to claim 1, wherein the recording layer has a formula of $Ge\alpha Ga\beta Sb\gamma Te100-\alpha-\beta-\gamma$, wherein $\alpha$ is a number of from 1 to 5 in units of atomic percent, $\beta$ is a number of from 1 to 5 in units of atomic percent, and $\gamma$ is a number of from 70 to 81 in units of atomic percent.

8. The information recording method according to claim 7, wherein an upper limit recrystallization linear speed, below which the recording layer heated by the laser light having the erasing power Pe re-crystallizes, is from 14 m/s to 20 m/s.

9. The information recording method according to claim 7, wherein the recording layer has such a property as to crystallize at a temperature of from 160 to 210° C. when heated at a heating speed of 10° C./min.

* * * * *